R. M. LEGGETT.
PROCESS FOR REMOVING PHENOL AND OTHER AROMATIC HYDROCARBONS FROM WATER OR OTHER LIQUIDS.
APPLICATION FILED DEC. 23, 1918.
1,341,913. Patented June 1, 1920.
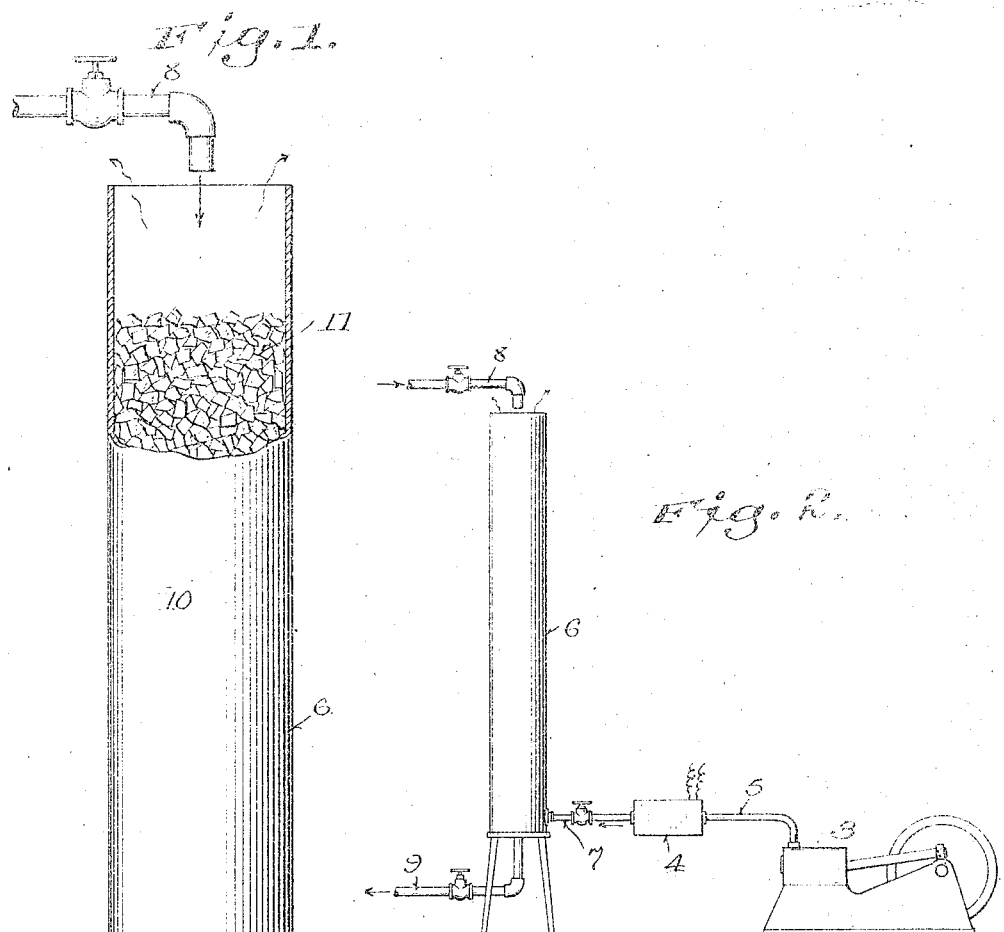

UNITED STATES PATENT OFFICE.

ROSS M. LEGGETT, OF AKRON, OHIO, ASSIGNOR TO OZONE COMPANY OF AMERICA, OF MILWAUKEE, WISCONSIN, A CORPORATION OF DELAWARE.

PROCESS FOR REMOVING PHENOL AND OTHER AROMATIC HYDROCARBONS FROM WATER OR OTHER LIQUIDS.

1,341,913.    Specification of Letters Patent.    Patented June 1, 1920.

Application filed December 23, 1918. Serial No. 268,024.

*To all whom it may concern:*

Be it known that I, ROSS M. LEGGETT, a citizen of the United States, and resident of Akron, in the county of Summit and State of Ohio, have invented new and useful Improvements in Processes for Removing Phenol and other Aromatic Hydrocarbons from Water or other Liquids, of which the following is a description, reference being had to the accompanying drawings, which are a part of this specification.

In localities where the waste effluent of gas works, chemical plants and other industrial institutions contain phenol and other aromatic hydrocarbons, and said effluent is discharged into the public water supply, this water supply becomes contaminated by said phenol or other aromatic hydrocarbons, and due to its taste and odor is rendered unfit for drinking purposes and domestic use, and this unfitness of the water supply containing such effluent is more pronounced in localities where it is necessary to treat the public water supply with chlorin.

My invention relates to a process for treating water or other liquids which contain phenol and other aromatic hydrocarbons such as the effluent above described, with a view to the alteration or destruction of said aromatic hydrocarbons so that it is possible to discharge waste effluent of gas works, chemical plants or other industrial institutions containing said aromatic hydrocarbons into sources of public water supply.

Taking phenol (carbolic acid) as an example, one part in one million parts of water imparts to such a dilution a distinct flavor of phenol, which flavor appears to be enhanced by contact with organic matter from sewerage effluent, and also by combination with chlorin when used as a disinfecting agent, or which by other means gains access to public water supplies contaminated with aromatic hydrocarbons such as effluent.

My invention is primarily intended to be applied to factory effluent containing aromatic hydrocarbons previous to their discharge into public water sources, but may be applied to public water supplies contaminated with such aromatic hydrocarbons which have found access to said supply or which have been introduced into such supply without chemical or other treatment. Where the effluent to be treated contains considerable solid matter in suspension or contains matter which may be readily precipitated from the effluent, the several steps of the process are as follows:

First: Coagulation of the effluent or the water supply containing the effluent with ferrous sulfate and lime water or milk of lime, or by the use of alum or any other suitable coagulating medium. This coagulation may be effected in any suitable type of apparatus.

The next step is sedimentation, that is, the solid mater of the coagulated mixture is allowed to settle, leaving the clear effluent liquid containing the phenol or other aromatic hydrocarbon free from the sediment. The reason for the coagulation and sedimentation which relate to the removal of solid matter in the effluent or water supply containing the effluent is to facilitate the removal of the phenol or other aromatic hydrocarbons from said effluent or water supply containing effluent as hereinafter described.

The next step consists generally in separating the clear liquor containing phenol or other aromatic hydrocarbon from the sediment, and this may be done in any well known manner, as by straining the mixture containing the sediment through suitable straining apparatus to remove the coagulated matter from the clear fluid. The liquid is now in a condition to be treated for the removal of phenol or other aromatic hydrocarbon, and this step of the process consists in ozonization of this clear liquid containing phenol or other aromatic hydrocarbon.

The ozonization consists in bringing ozone into contact with the liquid, and this may be done in any suitable manner, but I prefer to employ a mixing tower in which the ozone is lead up through the liquid, placed within a tower.

In the drawing accompanying this application, Figure 1 is a view, partly in section, of a tower for use in ozonizing the effluent or water supply containing effluent, and Fig. 2 is a diagrammatic view of the tower and ozonizing apparatus.

Referring to Fig. 2, the numeral 3 designates an air compressor; 4 an ozone generator to which the air is delivered from the pump 3 by pipe 5; 6 the tower to which the ozone is delivered under pressure through a pipe 7; 8 the supply pipe for the liquid to be treated, and 9 the discharge pipe for the purified liquid, that is, the liquid which has been freed from the contamination of phenol or other aromatic hydrocarbon. The tower 6 may be of any suitable construction as previously stated, so as to bring the ozone into intimate contact with the liquid to be treated, and baffle plates, mushroom plates or other suitable disintregrators or separators may be used in the tower, but I prefer to use a tower such as shown in Fig. 1, in which the shell 10 of the tower is filled with small pieces of coke, 11, and in which the ozone is fed into the base of the tower by the pipe 7 through a perforated end 12. With this construction the liquid to be treated is introduced into the shell 10 from the top and partially fills the tower. The ozone is then fed into the base of the tower under pressure, and due to this pressure its upper passage through the tower agitates the small pieces of coke which aid in splitting up the ozone and liquid in the tower to bring them into intimate contact with each other, whereby the liquid to be treated is thoroughly impregnated with ozone, and the process of ozonization so alters the aromatic hydrocarbons by the decomposition of the carbon content and the consequent hydrogenation of the various hydrocarbons reassembling them into water and innocuous gases so that all odors and taste are impossible of detection in a dilution of one part of treated effluent in a hundred parts of water, so that the effluent thus treated may be discharged into public water sources without contaminating influence or effect, and so that public water sources containing the objectionable effluent may be treated so that said sources may be used for drinking and other domestic purposes.

Coagulation is resorted to in order to remove from the fluid under treatment as large a percentage as possible of a solid matter so as to reduce so far as possible the consumption of the final oxidizing agent ozone, which consumption is an important factor in the commercial application of the process, and sedimentation permits this coagulated solid matter to be removed from the fluid under treatment with this same object of reducing the consumption of the final oxidizing agent, ozone.

What I claim as my invention is:

1. The process of removing phenol or other aromatic hydrocarbons from water or other liquids containing phenol or other aromatic hydrocarbons which consists in coagulation of the mixture under treatment followed by sedimentation and removal of the sediment from the liquid and thereafter ozonizing said liquid.

2. The process of removing phenol or other aromatic hydrocarbons from water or other liquids containing phenol or other aromatic hydrocarbons which consists in coagulation of the mixture under treatment followed by sedimentation and removal of the coagulated matter and then introducing ozone under pressure into the liquid.

3. The process of removing phenol or other aromatic hydrocarbons from water or other liquids containing the same which consists in coagulation of the mixture under treatment, separation of the coagulated matter from the liquid, and then introducing ozone under pressure into the resulting liquid and agitating the mixture.

In testimony whereof, I affix my signature.

ROSS M. LEGGETT.